United States Patent
Liu et al.

(10) Patent No.: US 9,621,244 B2
(45) Date of Patent: Apr. 11, 2017

(54) METHOD AND APPARATUS FOR QUANTIZING CHANNEL STATE INFORMATION

(71) Applicant: Alcatel Lucent, Boulogne Billancourt (FR)

(72) Inventors: Hao Liu, Shanghai (CN); Lu Wu, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 14/782,818

(22) PCT Filed: Apr. 7, 2013

(86) PCT No.: PCT/CN2013/000401
§ 371 (c)(1),
(2) Date: Oct. 7, 2015

(87) PCT Pub. No.: WO2014/166011
PCT Pub. Date: Oct. 16, 2014

(65) Prior Publication Data
US 2016/0065283 A1    Mar. 3, 2016

(51) Int. Cl.
*H04L 1/02* (2006.01)
*H04W 72/06* (2009.01)
(Continued)

(52) U.S. Cl.
CPC ......... *H04B 7/0486* (2013.01); *H04B 7/0456* (2013.01); *H04B 7/0469* (2013.01);
(Continued)

(58) Field of Classification Search
CPC .. H04B 7/0456; H04B 7/0486; H04B 7/0469; H04L 27/2636
(Continued)

(56) References Cited

U.S. PATENT DOCUMENTS

2007/0127586 A1* 6/2007 Hafeez ................ H04B 7/0634
375/267
2008/0095258 A1    4/2008 She et al.
(Continued)

FOREIGN PATENT DOCUMENTS

CN    101166052 A    4/2008
CN    102340741 A    2/2012
(Continued)

OTHER PUBLICATIONS

R1-103702, 3GPP TSG RAN WG1 61bis, Link-Level Evaluation Results on 8Tx Codebook, Dresden, Germany, Jun. 28-Jul. 2, 2010, 9 pp.
(Continued)

*Primary Examiner* — Parth Patel
*Assistant Examiner* — Jason Harley
(74) *Attorney, Agent, or Firm* — Fay Sharpe, LLP (57) ABSTRACT

The present invention relates to a method and an apparatus for quantizing channel state information (CSI). An embodiment of the present invention provides a method for providing codeword index information to a base station configured with $N_t$ directional antennas, including: determining a first codeword in a first codebook whose rank is r, where r=1, 2, . . . , $N_t$, and sending an index of the codeword to the base station; and determining a second codeword in a second codebook whose rank is r, and sending an index of the codeword to the base station. The first codeword is a block diagonal matrix, and a matrix on a diagonal block of the block diagonal matrix is a matrix with $N_t/2$ rows and $N_b$ columns. The $N_b$ columns are $N_b$ different Discrete Fourier Transform (DFT) vectors arbitrarily selected from N predefined DFT vectors, N is an integer power of 2, $1 \leq N_b \leq N$, and the length of each DFT vector is $N_t$. Each column corresponding to each data stream in the second codeword
(Continued)

includes an equal-length column selection vector for individually selecting from the $N_b$ columns in the first codeword the DFT vectors used in two polarization directions and co-phasing information $\theta=2\pi m/M$ between the two polarization directions, where M is an integer power of 2, and $0 \leq m \leq M-1$.

14 Claims, 3 Drawing Sheets

(51) Int. Cl.
    *H04B 7/04*           (2017.01)
    *H04B 7/0456*       (2017.01)
    *H04B 7/06*           (2006.01)

(52) U.S. Cl.
    CPC ........... *H04B 7/0478* (2013.01); *H04B 7/065* (2013.01); *H04B 7/0639* (2013.01)

(58) Field of Classification Search
    USPC .................................. 370/329, 210; 704/222
    See application file for complete search history.

(56) References Cited

U.S. PATENT DOCUMENTS

2011/0216846 A1    9/2011   Lee et al.
2012/0219042 A1    8/2012   Onggosanusi et al.
2013/0058424 A1*  3/2013   Enescu ................ H04B 7/0486
                                          375/267
2013/0129004 A1*  5/2013   Sun ...................... H04L 5/0032
                                          375/285
2013/0129014 A1*  5/2013   Kim ..................... H04B 7/0456
                                          375/295

FOREIGN PATENT DOCUMENTS

CN          102769484 A       7/2012
CN          102769484 A  *  11/2012  ........... H04B 7/0486
WO    WO 2012/150505 A1   11/2011

OTHER PUBLICATIONS

R1-112420, 3GPP TSG RAN WG1 66, Considerations on CSI feedback enhancements for high-priority antenna configurations, Athens, Greece, Aug. 22-26, 2011, 7 pp.
International Search Report for PCT/CN2013/000401 dated Jan. 16, 2014.
European Patent App. No. 13881996.6, Extended European Search Report, mailed Nov. 21, 2016, 10 pp.
Wu et al., Codebook Design for LTE-A Downlink System, Research and Innovation Center, Alcatel-Lucent Shanghai Bell, Shanghai, China, 5 pp.
R1-130934, 3GPP TSG-RAN WG1 #72bis, Codebook Structure and Details, Alcatel-Lucent Shanghai, Chicago, Illinois, US, Apr. 15-19, 2013, 6 pp.
R1-131452, 3GPP TSG-RAN WG1 #72bis, Design and Use of the 4TX Double Codebook, Ericsson, Chicago, Illinois, US, Apr. 15-19, 2013, 4 pp.

* cited by examiner

METHOD AND APPARATUS FOR QUANTIZING CHANNEL STATE INFORMATION

BACKGROUND OF THE INVENTION

Field of the Invention

The present invention relates to a method and an apparatus for wireless communications, and in particular, to a method and an apparatus for quantizing channel state information (CSI) in a wireless communication system.

Description of the Prior Art

As the biggest new technological research and development project launched by the 3rd Generation Partnership Project (3GPP) in recent years, the Long Term Evolution/Long Term Evolution-Advanced (LTE/LTEA) project takes the Orthogonal Frequency Division Multiplexing/Frequency Division Multiple Access (OFDM/FDMA) technology as the core technology, and will be the world's most important wide-area broadband mobile communication system in the future. As is well known, CSI quantization is a key issue in the Frequency Division Duplex (FDD) system; however, although there are many LTE/LTE-A standard versions in the field, all these standard versions fail to well solve the problem of feedback of CSI of various antenna arrays such as cross polarized antenna arrays (CLAs), which hinders further development and implementation of the technology.

SUMMARY OF THE INVENTION

An objective of the present invention is to provide an effective technical solution of quantizing CSI of an antenna array, so as to solve the problem in the development of LTE/LTE-A.

An embodiment of the present invention provides a method for providing codeword index information to a base station from a user equipment (UE), the base station being configured with $N_t$ directional antennas. The method includes: determining by the UE, according to an estimated broadband channel matrix and based on a first predetermined criterion, a first codeword in a first codebook whose rank is r, where the first codeword indicates broadband/long-term channel characteristics of antenna pairs having the same polarization direction, and r=1, 2, . . . , $N_t$, and sending a codeword index of the first codeword to the base station; and determining by the UE, for each sub-band according to an estimated sub-band channel matrix and based on a second predetermined criterion, a second codeword in a second codebook whose rank is r, where the second codeword indicates sub-band/short-term channel characteristics of each polarization direction and between the polarization directions, and sending a codeword index of the second codeword to the base station. The first codeword is a block diagonal matrix, a matrix on a diagonal block of the block diagonal matrix is a matrix with $N_t/2$ rows and $N_b$ columns, the $N_b$ columns are $N_b$ different Discrete Fourier Transform (DFT) vectors arbitrarily selected from N predefined DFT vectors, N is an integer power of 2, $1 \le N_b \le N$, and the length of each DFT vector is $N_t$. The second codeword is constructed based on column selection of the first codeword and co-phasing information between the polarization directions, and each column corresponding to each data stream in the second codeword includes an equal-length column selection vector for individually selecting from the $N_b$ columns in the first codeword the DFT vectors used in two polarization directions and co-phasing information $$\theta = \frac{2\pi m}{M}$$

between the two polarization directions, where M is an integer power of 2, and $0 \le m \le M-1$.

In an embodiment, the column selection vector $\tilde{e}_l$ is an $N_b \times 1$ selection vector, and except that an $l^{th}$ ($1 \le l \le N_b$) element is 1, all other values are 0. The first codeword of the block diagonal matrix is quantized by using $N_u$ bits, where $N_u$ is equal to or less than $\log_2 N$; $N_o$ bits are used to quantize the co-phasing information, where $N_o$ is equal to or less than $\log_2 M$, and the same or different values are taken for $N_o$ corresponding to different ranks; and $N_e$ bits are used to quantize the column selection vector, where each column selection vector $N_e$ is equal to or less than $\log_2 N_b$. In another embodiment, the $N_b$ columns are four columns, where the DFT vectors in the first column and the second column and the DFT vectors in the third column and the fourth column are adjacent vectors, and the DFT vectors in the first column and the third column and the DFT vectors in the second column and the fourth column are orthogonal vectors. When the rank is 1, the second codeword has one column of data streams; when the $N_t$ directional antennas are arranged closely, column selection vectors corresponding to a first polarization direction and column selection vectors corresponding to a second polarization direction in the column of data streams determine identical DFT vectors in the first codeword; and when $N_t$ linearly polarized antennas are arranged sparsely, column selection vectors corresponding to the first polarization direction and column selection vectors corresponding to the second polarization direction in the column of data streams determine orthogonal DFT vectors in the first codeword. Similarly, when the rank is 2, the second codeword has two columns of data streams; when $N_t$ linearly polarized antennas are arranged closely, column selection vectors respectively corresponding to two polarization directions in each column of the two columns of data streams determine identical DFT vectors in the first codeword, and two column selection vectors in each polarization direction determine identical or orthogonal DFT vectors in the first codeword; and when the $N_t$ linearly polarized antennas are arranged sparsely, column selection vectors respectively corresponding to two polarization directions in each column of the two columns of data streams determine orthogonal DFT vectors in the first codeword, and two column selection vectors in each polarization direction determine identical or orthogonal DFT vectors in the first codeword. When the rank is 3, the second codeword has three columns of data streams; when $N_t$ linearly polarized antennas are arranged closely, column selection vectors respectively corresponding to two polarization directions in each column of the three columns of data streams determine identical DFT vectors in the first codeword, and in DFT vectors determined in the first codeword by three column selection vectors in each polarization direction, two vectors are identical and another one is orthogonal to the two; and when the $N_t$ linearly polarized antennas are arranged sparsely, column selection vectors respectively corresponding to two polarization directions in each column of the three columns of data streams determine orthogonal DFT vectors in the first codeword, and in DFT vectors determined in the first codeword by three column selection vectors in each polarization direction, two vectors are identical and another one is orthogonal to the two. When the rank is 4, the second codeword has four columns of data streams; when $N_t$ linearly polarized antennas are arranged closely, column selection vectors respectively corresponding to two polarization directions in each column of the four columns of data streams determine identical DFT vectors in the first codeword, and in DFT vectors determined in the first codeword by four column selection vectors in each polarization direction, the first column is identical with the third column, the second column is identical with the fourth column, and the first column is orthogonal to the second column; and when the $N_t$ linearly polarized antennas are arranged sparsely, column selection vectors respectively corresponding to two polarization directions in each column of the four columns of data streams determine orthogonal DFT vectors in the first codeword, and in DFT vectors determined in the first codeword by four column selection vectors in each polarization direction, the first column is identical with the third column, the second column is identical with the fourth column, and the first column is orthogonal to the second column.

Correspondingly, an embodiment of the present invention further provides a method for determining a codeword by a base station, the method including: receiving an index of a first codeword in a first codebook whose rank is r, where the first codeword indicates broadband/long-term channel characteristics of antenna pairs having the same polarization direction, and r=1, 2, . . . , $N_t$; receiving an index of a second codeword in a second codebook whose rank is r, where the second codeword indicates sub-band/short-term channel characteristics of each polarization direction and between the polarization directions; determining, according to the index of the first codeword, the first codeword from the first codebook whose rank is r; determining, according to the index of the second codeword, the second codeword from the second codebook whose rank is r; and ultimately determining the codeword based on the first codeword and the second codeword. The first codeword is a block diagonal matrix, a matrix on a diagonal block of the block diagonal matrix is a matrix with $N_t/2$ rows and $N_b$ columns, the $N_b$ columns are $N_b$ different DFT vectors arbitrarily selected from N predefined DFT vectors, N is an integer power of 2, $1 \leq N_b \leq N$, and the length of each DFT vector is $N_t$. The second codeword is constructed based on column selection of the first codeword and co-phasing information between the polarization directions, and each column corresponding to each data stream in the second codeword includes an equal-length column selection vector for individually selecting from the $N_b$ columns in the first codeword the DFT vectors used in two polarization directions and co-phasing information $$\theta = \frac{2\pi m}{M}$$

between the two polarization directions, where M is an integer power of 2, and $0 \leq m \leq M-1$.

Embodiments of the present invention further provide a UE and a base station capable of performing the above method respectively. The UE includes: a first codeword determination means, for determining, according to an estimated broadband channel matrix and based on a first predetermined criterion, a first codeword in a first codebook whose rank is r, where the first codeword indicates broadband/long-term channel characteristics of antenna pairs having the same polarization direction, and r=1, 2, . . . ; a first codeword index sending means, for sending a codeword index of the first codeword to the base station; a second codeword determination means, for determining, for each sub-band according to an estimated sub-band channel matrix and based on a second predetermined criterion, a second codeword in a second codebook whose rank is r, where the second codeword indicates sub-band/short-term channel characteristics of each polarization direction and between the polarization directions; and a second codeword index sending means, for sending a codeword index of the second codeword to the base station. The base station includes a first codeword index receiving means, for receiving an index of a first codeword in a first codebook whose rank is r, where the first codeword indicates broadband/long-term channel characteristics of antenna pairs having the same polarization direction, and r=1, 2, . . . ; a second codeword index receiving means, for receiving an index of a second codeword in a second codebook whose rank is r, where the second codeword indicates sub-band/short-term channel characteristics of each polarization direction and between the polarization directions; a first codeword determination means, for determining, according to the index of the first codeword, the first codeword from the first codebook whose rank is r; a second codeword determination means, for determining, according to the index of the second codeword, the second codeword from the second codebook whose rank is r; and an ultimate codeword determination means, for ultimately determining the codeword based on the first codeword and the second codeword.

An embodiment of the present invention further provides a wireless communication system including the UE and the base station.

The present invention provides a novel method and apparatus capable of quantizing CSI for directional antennas, which better solves the problem in the development of LTE/LTEA that accurate quantization cannot be implemented in the arrangement of some antennas such as cross polarized antennas, and improves accuracy of quantization with a lower quantization overhead.

DETAILED DESCRIPTION

For better comprehension of the spirit of the present invention, a further description is provided below with reference to some exemplary embodiments of the present invention.

In the development of an LTE/LTEA system, when a base station is configured with a CLA, persons skilled in the art find that performance of down link Multiple User-Multiple Input Multiple Output (MU-MIMO) is not as expected. The main reason is that quantization feedback of CSI for such cross polarized antennas is not accurate enough.

The embodiments of the present invention may solve the problem of quantization of CSI of the CLA, to improve accuracy of the quantization.

According to an embodiment of the present invention, in a down link Multiple Input Multiple Output (MIMO) system, a base station, for example, an evolved Node Base (eNB), is equipped with $N_t$ cross polarized antennas. Corresponding codebooks are respectively constructed for each rank r, where r=0, 1, . . . , $N_t$. Codebooks of different ranks r form a two-stage codebook, respectively including a first codebook and a second codebook. An ultimate codebook is determined based on the first codebook and the second codebook according to a certain rule, for example, for a codeword in a two-stage codebook of a certain rank, a codeword matrix of the first codebook is multiplied by a codeword matrix of the second codebook. The first codebook, the second codebook and the ultimately determined codebook having different ranks as well as the rule for determining the ultimate codebook are stored in a base station and a UE respectively, for quantizing CSI. The UE provides a codeword index for quantizing CSI to the base station, and the base station determines a codeword based on the received codeword index to obtain the CSI.

Figure 1:
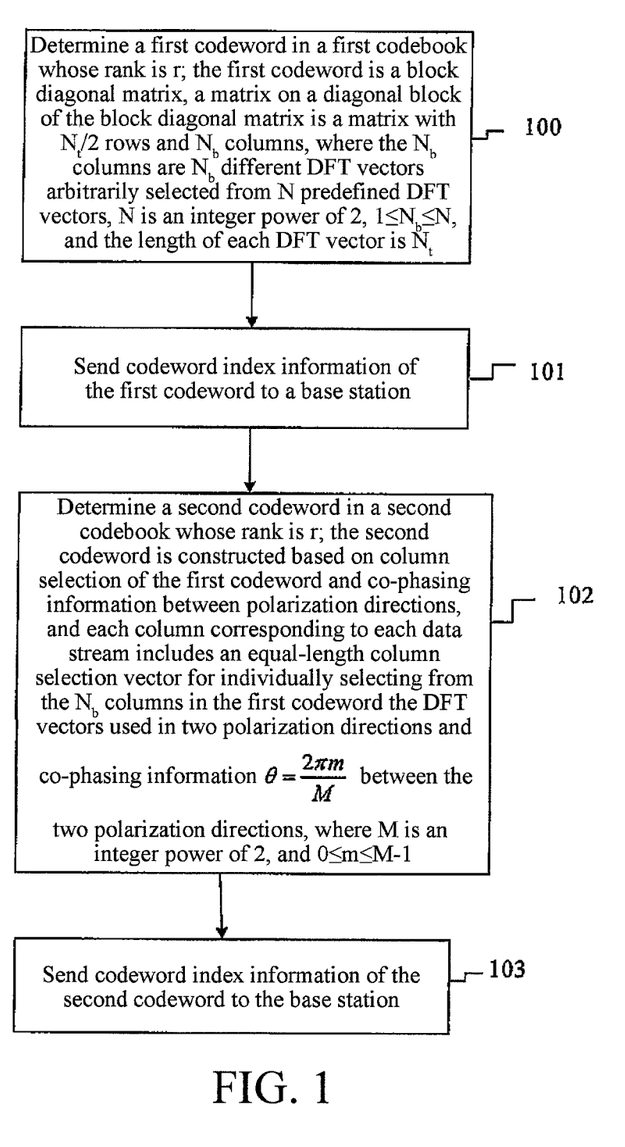
FIG. 1 is a flow chart of a method for quantizing CSI with a two-stage codebook according to an embodiment of the present invention, where the method is performed on a UE side.

FIG. 1 is a flow chart of a method for quantizing CSI with a two-stage codebook according to an embodiment of the present invention, where the method is performed on a UE side, and is a method for providing codeword index information to a base station from a UE. It should be noted that the flow chart is only for clearly demonstrating the embodiment of the present invention, but is not intended to limit the sequence between the steps (the same below).

As shown in FIG. 1, in Step 100, the UE determines a first codeword in a first codebook whose rank is r according to an estimated long duration and/or broadband channel matrix and based on a predetermined criterion, such as capacity maximization criterion or distance minimization criterion understood by persons skilled in the art. The first codeword is a block diagonal matrix, a matrix on a diagonal block of the block diagonal matrix is a matrix with $N_t/2$ rows and $N_b$ columns, the $N_b$ columns are $N_b$ different DFT vectors arbitrarily selected from N predefined DFT vectors, N is an integer power of 2, $1 \leq N_b \leq N$, and the length of each DFT vector is $N_t$.

In Step 101, the UE sends a codeword index of the determined first codeword to the base station.

For each sub-band, in Step 102, the UE determines a second codeword in a second codebook whose rank is r according to an estimated short duration and/or sub-band channel matrix and based on a predetermined criterion (the predetermined criterion may be identical with or different from the predetermined criterion for determining the first codeword, and needs to be combined with information of the determined first codeword). The second codeword is constructed based on column selection of the first codeword and co-phasing information between polarization directions, and each column corresponding to each data stream in the second codeword includes an equal-length column selection vector for individually selecting from the $N_b$ columns in the first codeword the DFT vectors used in two polarization directions and co-phasing information $$\theta = \frac{2\pi m}{M}$$

between the two polarization directions, where M is an integer power of 2, and $0 \leq m \leq M-1$.

In Step 103, the UE sends a codeword index of the second codeword to the base station.

Figure 2:
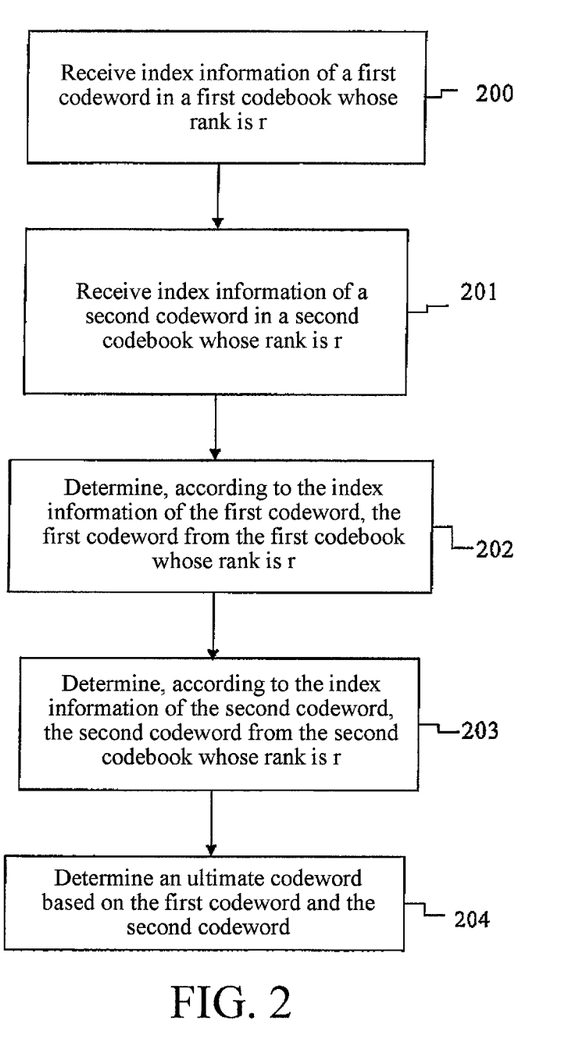
FIG. 2 is a flow chart of a method for quantizing CSI with a two-stage codebook according to an embodiment of the present invention, where the method is performed on a base station side.

Correspondingly, FIG. 2 is a flow chart of a method for quantizing CSI with a two-stage codebook according to an embodiment of the present invention, where the method is performed on a base station side, and is a method for determining a codeword by a base station.

As shown in FIG. 2, in Step 200, the base station receives an index of a first codeword in a first codebook whose rank is r.

In Step 201, receive an index of a second codeword in a second codebook whose rank is r.

In Step 202, determine, according to the index of the first codeword, the first codeword from the first codebook whose rank is r.

In Step 203, determine, according to the index of the second codeword, the second codeword from the second codebook whose rank is r.

To obtain ultimate CSI, in Step 204, the base station determines an ultimate codeword based on the first codeword and the second codeword.

By taking a four-antenna CLA as an example, a two-stage codebook may be used to quantize CSI, and a codeword in the two-stage codebook may be represented as: $W=W_1 W_2$, where $W_1$ is the first codeword in the first-stage codebook, indicating broadband/long-term channel characteristics of antenna pairs having the same polarization direction, and $W_2$ is the second codeword in the second-stage codebook, indicating sub-band/short-term channel characteristics of each polarization direction and between the polarization directions.

Specifically, $W_1$ is a block diagonal matrix, and $$W_1 = \begin{bmatrix} V & 0 \\ 0 & V \end{bmatrix}.$$

A matrix V on a diagonal block of the block diagonal matrix is an $N_t/2 \times N_b$ matrix, and is a $2 \times N_b$ matrix for the four-antenna CLA. V may be further represented as $V=[u_1, \ldots u_{N_b}]$, where $u_i$, $i \in (1, \ldots, N_b)$ is a vector arbitrarily selected from N predefined DFT vectors, N is usually an integer power of 2, and vectors in the $N_b$ columns are different. The N predefined DFT vectors may be obtained by means of well-known technologies in this field, which will not be described herein again. $N_u$ bits may be used to quantize the first codeword of the block diagonal matrix, where $N_u$ is equal to or less than $\log_2 N$, and is a quantization overhead for the first codeword in the first codebook. For example, when $N_b=4$, $$V = [u_1, u_2, u_3, u_4] = \begin{bmatrix} 1 & 1 & 1 & 1 \\ e^{j\frac{2n\pi}{N}} & e^{j\frac{2(n+1)\pi}{N}} & -e^{j\frac{2n\pi}{N}} & -e^{j\frac{2(n+1)\pi}{N}} & V \end{bmatrix},$$

$$(n = 0, \ldots, N-1).$$

In this embodiment, to better describe the antenna arrangement, first and second vectors as well as third and fourth vectors are adjacent vectors, and the first and third vectors as well as the second and fourth vectors are orthogonal vectors.

N may be further set as 16, and $$V = \begin{bmatrix} 1 & 1 & 1 & 1 \\ e^{j\frac{2n\pi}{16}} & e^{j\frac{2(n+1)\pi}{16}} & -e^{j\frac{2n\pi}{16}} & -e^{j\frac{2(n+1)\pi}{16}} \end{bmatrix}, (n=0,\ldots,15).$$

In this case, the first codeword in the first-stage codebook is defined as:

$$W = \begin{bmatrix} \begin{bmatrix} 1 & 1 & 1 & 1 \\ e^{j\frac{2n\pi}{16}} & e^{j\frac{2(n+1)\pi}{16}} & -e^{j\frac{2n\pi}{16}} & -e^{j\frac{2(n+1)\pi}{16}} \end{bmatrix} & 0 \\ 0 & \begin{bmatrix} 1 & 1 & 1 & 1 \\ e^{j\frac{2n\pi}{16}} & e^{j\frac{2(n+1)\pi}{16}} & -e^{j\frac{2n\pi}{16}} & -e^{j\frac{2(n+1)\pi}{16}} \end{bmatrix} \end{bmatrix},$$

$(n=0,\ldots,15).$

The second codeword in the second codebook is constructed based on column selection of the first codeword and co-phasing information between the polarization directions. Each column (corresponding to each data stream or rank) of the second codeword includes an equal-length column selection vector for individually selecting from the $N_b$ columns in $W_1$ the DFT vector used in each polarization direction and co-phasing information between the polarization directions.

For example, for the above four-antenna cross polarized antennas, when the rank is 1, the second codeword $W_2$ may be represented as:

$$W_2 \in \left\{ \frac{1}{\sqrt{2}} \begin{bmatrix} Y_1 \\ e^{j\frac{2\pi m}{M}} Y_2 \end{bmatrix} \right\}, (m=0,\ldots,M-1).$$

where $Y_1$ and $Y_2$ respectively denote a first column selection vector and a second column selection vector for individually selecting from the $N_b$ columns in $W_1$ the DFT vector used in the first polarization direction and the DFT vector used in the second polarization direction. Each column selection vector $\tilde{e}_l$ is an $N_b \times 1$ selection vector, and except that an $l^{th}$ ($1 \leq l \leq N_b$) element is 1, all other values are 0. Each column selection vector may be quantized by using $N_e$, and a quantization overhead of each column selection vector is equal to or less than $\log_2 N_b$. The co-phasing information $$\theta = \frac{2\pi m}{M}$$

between two polarization directions may be quantized by using $N_\theta$, that is, a quantization overhead thereof is equal to or less than $\log_2 M$ bits. Similar to N, persons skilled in the art should understand that M is usually an integer power of 2 and how to determine the co-phasing information. It should be noted that, the value of $N_\theta$ may be different in the case of a different rank.

When M=4, the second codeword in the second codebook whose rank is 1 may be further represented as:

$$W_2 \in \left\{ \frac{1}{\sqrt{2}} \begin{bmatrix} Y_1 \\ e^{j\frac{2\pi m}{4}} Y_2 \end{bmatrix} \right\}, (m=0,\ldots,3).$$

The quantization overhead of the co-phasing information is 2 bits.

For different antenna arrangements, settings of the column selection vectors $Y_1$ and $Y_2$ are different, that is, there may be different selection manners for different antenna arrangements. For example, for a cross polarized linear antenna array closely arranged (e.g., the antenna spacing is about half of the carrier wavelength), $Y_1$ and $Y_2$ may determine identical vectors in the first codeword. In this embodiment, considering that the first and second vectors as well as the third and fourth vectors in the first codeword are adjacent vectors, the first and second column selection vectors $Y_1$ and $Y_2$ may be selected as:

$$\begin{bmatrix} Y_1 \\ Y_2 \end{bmatrix} \in \left\{ \begin{bmatrix} \tilde{e}_1 \\ \tilde{e}_1 \end{bmatrix}, \begin{bmatrix} \tilde{e}_2 \\ \tilde{e}_2 \end{bmatrix} \right\}.$$

For a cross polarized linear antenna array sparsely arranged (e.g., the antenna spacing is about 4 times the carrier wavelength), $Y_1$ and $Y_2$ may determine orthogonal vectors in the first codeword. In this embodiment, considering that the first and second vectors as well as the third and fourth vectors in the first codeword are adjacent vectors, the first and second column selection vectors $Y_1$ and $Y_2$ may be selected as:

$$\begin{bmatrix} Y_1 \\ Y_2 \end{bmatrix} \in \left\{ \begin{bmatrix} \tilde{e}_1 \\ \tilde{e}_3 \end{bmatrix}, \begin{bmatrix} \tilde{e}_2 \\ \tilde{e}_4 \end{bmatrix} \right\}.$$

The quantization overhead of the first codeword whose rank is 1 includes a two-bit co-phasing overhead and a two-bit column selection overhead.

When the rank is 2, the second codeword includes two columns of data streams, and the second codeword may be represented as:

$$W_2 \in \left\{ \frac{1}{\sqrt{2}} \begin{bmatrix} Y_1 & Y_3 \\ e^{j\frac{2\pi m}{M}} Y_2 & -e^{j\frac{2\pi m}{M}} Y_4 \end{bmatrix} \right\}.$$

As stated above, in column selection vectors $Y_1$, $Y_2$, $Y_3$ and $Y_4$ included in each column of the second codeword, $Y_1$ and $Y_3$ are column selection vectors for individually selecting from the $N_b$ columns in $W_1$ the DFT vector used in the first polarization direction, and $Y_2$ and $Y_4$ are column selection vectors for individually selecting from the $N_b$ columns in $W_1$ the DFT vector used in the second polarization direction. Each column selection vector $\tilde{e}_l$ is an $N_b \times 1$ selection vector, and except that an $l^{th}$ ($1 \le l \le N_b$) element is 1, all other values are 0.

If M is set as 4 and only one-bit co-phasing information quantization is taken, the second codeword may be further set as:

$$W_2 \in \left\{ \frac{1}{\sqrt{2}} \begin{bmatrix} Y_1 & Y_3 \\ Y_2 & -Y_4 \end{bmatrix}, \frac{1}{\sqrt{2}} \begin{bmatrix} Y_1 & Y_3 \\ jY_2 & -jY_4 \end{bmatrix} \right\}.$$

Similarly, for a cross polarized linear antenna array closely arranged, column selection vectors $Y_1$, $Y_2$ and $Y_3$, $Y_4$ in each column (data stream) that are used in two polarization directions may determine identical vectors in the first codeword, and column selection vectors $Y_1$, $Y_3$ and $Y_2$, $Y_4$ between two columns (data streams) may determine identical or orthogonal vectors in the first codeword; therefore, $Y_1$-$Y_4$ may be selected as:

$$\begin{bmatrix} Y_1 & Y_3 \\ Y_2 & Y_4 \end{bmatrix} \in \left\{ \begin{bmatrix} \tilde{e}_1 & \tilde{e}_1 \\ \tilde{e}_1 & \tilde{e}_1 \end{bmatrix}, \begin{bmatrix} \tilde{e}_2 & \tilde{e}_2 \\ \tilde{e}_2 & \tilde{e}_2 \end{bmatrix}, \begin{bmatrix} \tilde{e}_1 & \tilde{e}_3 \\ \tilde{e}_1 & \tilde{e}_3 \end{bmatrix}, \begin{bmatrix} \tilde{e}_2 & \tilde{e}_4 \\ \tilde{e}_2 & \tilde{e}_4 \end{bmatrix} \right\}.$$

$\tilde{e}_l$ is an $N_b \times 1$ selection vector, and except that an $l^{th}$ ($1 \le l \le N_b$) element is 1, all other values are 0.

For a cross polarized linear antenna array sparsely arranged, column selection vectors $Y_1$, $Y_2$ and $Y_3$, $Y_4$ in each column (data stream) that are used in two directions may determine orthogonal vectors in the first codeword, and column selection vectors $Y_1$, $Y_3$ and $Y_2$, $Y_4$ between two columns (data streams) may determine identical or orthogonal vectors in the first codeword; therefore, $Y_1$-$Y_4$ may be selected as:

$$\begin{bmatrix} Y_1 & Y_3 \\ Y_2 & Y_4 \end{bmatrix} \in \left\{ \begin{bmatrix} \tilde{e}_1 & \tilde{e}_1 \\ \tilde{e}_3 & \tilde{e}_3 \end{bmatrix}, \begin{bmatrix} \tilde{e}_2 & \tilde{e}_2 \\ \tilde{e}_4 & \tilde{e}_4 \end{bmatrix}, \begin{bmatrix} \tilde{e}_1 & \tilde{e}_3 \\ \tilde{e}_3 & \tilde{e}_1 \end{bmatrix}, \begin{bmatrix} \tilde{e}_2 & \tilde{e}_4 \\ \tilde{e}_4 & \tilde{e}_2 \end{bmatrix} \right\}.$$

The quantization overhead of the second codeword whose rank is 2 includes a 1-bit co-phasing information quantization overhead and a 3-bit column selection quantization overhead.

Similarly, when the rank is 3, the second codeword has three columns of data streams, and when $N_t$ linearly polarized antennas are arranged closely, column selection vectors respectively corresponding to two polarization directions in each column of the three columns of data streams determine identical DFT vectors in the first codeword, and in DFT vectors determined in the first codeword by three column selection vectors in each polarization direction, two vectors are identical and another one is orthogonal to the two. When the $N_t$ linearly polarized antennas are arranged sparsely, column selection vectors respectively corresponding to two polarization directions in each column of the three columns of data streams determine orthogonal DFT vectors in the first codeword, and in DFT vectors determined in the first codeword by three column selection vectors in each polarization direction, two vectors are identical and another one is orthogonal to the two.

Based on the relationship between the data streams, the second codeword may be simplified as:

$$W_2 \in \left\{ \frac{1}{\sqrt{2}} \begin{bmatrix} Y_1 & Y_3 \\ e^{j\frac{2\pi m}{M}} Y_2 & -e^{j\frac{2\pi m}{M}} Y_4 \end{bmatrix} \right\},$$

where $Y_1$-$Y_4$ may individually select from the first codeword one or two different appropriate DFT vectors for each data stream and each polarization direction, so as to implement description about three data streams in each polarization direction. In other words, although only two columns are listed in the form of expression, two column selection vectors $Y_1$ or $Y_3$ and $Y_2$ or $Y_4$ in each polarization direction may have two different optional settings, which also implements description about three data streams.

Specifically, it can be set that 0 bit is used to quantize the co-phasing information, and the second codeword may be further expressed as:

$$W_2 \in \left\{ \frac{1}{\sqrt{2}} \begin{bmatrix} Y_1 & Y_3 \\ Y_2 & -Y_4 \end{bmatrix} \right\}.$$

Similarly, for a cross polarized linear antenna array closely arranged, column selection vectors $Y_1$, $Y_2$ and $Y_3$, $Y_4$ in each column (data stream) that are used in two polarization directions may determine identical vectors in the first codeword, and $Y_1$-$Y_4$ may be selected as:

$$\begin{bmatrix} Y_1 & Y_3 \\ Y_2 & Y_4 \end{bmatrix} \in \left\{ \begin{bmatrix} \tilde{e}_1 & [\tilde{e}_1 \ \tilde{e}_3] \\ \tilde{e}_1 & [\tilde{e}_1 \ \tilde{e}_3] \end{bmatrix}, \begin{bmatrix} \tilde{e}_2 & [\tilde{e}_2 \ \tilde{e}_4] \\ \tilde{e}_2 & [\tilde{e}_2 \ \tilde{e}_4] \end{bmatrix}, \begin{bmatrix} \tilde{e}_3 & [\tilde{e}_1 \ \tilde{e}_3] \\ \tilde{e}_3 & [\tilde{e}_1 \ \tilde{e}_3] \end{bmatrix}, \begin{bmatrix} \tilde{e}_4 & [\tilde{e}_2 \ \tilde{e}_4] \\ \tilde{e}_4 & [\tilde{e}_2 \ \tilde{e}_4] \end{bmatrix}, \begin{bmatrix} [\tilde{e}_1 \ \tilde{e}_3] & \tilde{e}_3 \\ [\tilde{e}_1 \ \tilde{e}_3] & \tilde{e}_3 \end{bmatrix}, \begin{bmatrix} [\tilde{e}_2 \ \tilde{e}_4] & \tilde{e}_4 \\ [\tilde{e}_2 \ \tilde{e}_4] & \tilde{e}_4 \end{bmatrix}, \begin{bmatrix} [\tilde{e}_3 \ \tilde{e}_1] & \tilde{e}_1 \\ [\tilde{e}_3 \ \tilde{e}_1] & \tilde{e}_1 \end{bmatrix}, \begin{bmatrix} [\tilde{e}_4 \ \tilde{e}_2] & \tilde{e}_2 \\ [\tilde{e}_4 \ \tilde{e}_2] & \tilde{e}_2 \end{bmatrix} \right\}.$$

$\tilde{e}_l$ is an $N_b \times 1$ selection vector, and except that an $l^{th}$ ($1 \le l \le N_b$) element is 1, all other values are 0.

For a cross polarized linear antenna array sparsely arranged, column selection vectors $Y_1$, $Y_2$ and $Y_3$, $Y_4$ in each column (data stream) that are used in two polarization directions may determine orthogonal vectors in the first codeword, and $Y_1$-$Y_4$ may be selected as:

$$\begin{bmatrix} Y_1 & Y_3 \\ Y_2 & Y_4 \end{bmatrix} \in \left\{ \begin{bmatrix} [\tilde{e}_1 & [\tilde{e}_1 & \tilde{e}_3]] \\ [\tilde{e}_1 & [\tilde{e}_3 & \tilde{e}_1]] \end{bmatrix}, \begin{bmatrix} [\tilde{e}_2 & [\tilde{e}_2 & \tilde{e}_4]] \\ [\tilde{e}_4 & [\tilde{e}_4 & \tilde{e}_2]] \end{bmatrix}, \begin{bmatrix} [\tilde{e}_3 & [\tilde{e}_1 & \tilde{e}_3]] \\ [\tilde{e}_1 & [\tilde{e}_3 & \tilde{e}_1]] \end{bmatrix}, \begin{bmatrix} [\tilde{e}_4 & [\tilde{e}_2 & \tilde{e}_4]] \\ [\tilde{e}_2 & [\tilde{e}_4 & \tilde{e}_2]] \end{bmatrix}, \\ \begin{bmatrix} [\tilde{e}_1 & \tilde{e}_3] & \tilde{e}_3 \\ [\tilde{e}_3 & \tilde{e}_1] & \tilde{e}_1 \end{bmatrix}, \begin{bmatrix} [\tilde{e}_2 & \tilde{e}_4] & \tilde{e}_4 \\ [\tilde{e}_4 & \tilde{e}_2] & \tilde{e}_2 \end{bmatrix}, \begin{bmatrix} [\tilde{e}_3 & \tilde{e}_1] & \tilde{e}_1 \\ [\tilde{e}_1 & \tilde{e}_3] & \tilde{e}_3 \end{bmatrix}, \begin{bmatrix} [\tilde{e}_4 & \tilde{e}_2] & \tilde{e}_2 \\ [\tilde{e}_2 & \tilde{e}_4] & \tilde{e}_4 \end{bmatrix} \right\}.$$

The quantization overhead of the second codeword whose rank is 3 only includes a 4-bit column selection quantization overhead.

By analogy, when the rank is 4, the second codeword has four columns of data streams, when $N_t$ linearly polarized antennas are arranged closely, column selection vectors respectively corresponding to two polarization directions in each column of the four columns of data streams determine identical DFT vectors in the first codeword, and in DFT vectors determined in the first codeword by four column selection vectors in each polarization direction, the first column is identical with the third column, the second column is identical with the fourth column, and the first column is orthogonal to the second column; and when the $N_t$ linearly polarized antennas are arranged sparsely, column selection vectors respectively corresponding to two polarization directions in each column of the four columns of data streams determine orthogonal DFT vectors in the first codeword, and in DFT vectors determined in the first codeword by four column selection vectors in each polarization direction, the first column is identical with the third column, the second column is identical with the fourth column, and the first column is orthogonal to the second column.

Also in consideration of the orthogonal relationship between the data streams, the second codeword may be represented as:

$$W_2 \in \left\{ \frac{1}{\sqrt{2}} \begin{bmatrix} Y_1 & Y_1 \\ e^{j\frac{2\pi m}{M}} Y_2 & -e^{j\frac{2\pi m}{M}} Y_2 \end{bmatrix} \right\},$$

where $Y_1$ and $Y_2$ may individually select from the first codeword two different appropriate DFT vectors for each data stream and each polarization direction, so as to implement description about four data streams in each polarization direction. In other words, although only two columns are listed in the form of expression, two column selection vectors $Y_1$ and $Y_2$ in each polarization direction may have two different optional settings, which also implements description about four data streams.

Specifically, it can be set that 1 bit is used to quantize the co-phasing information, and the second codeword may be further expressed as:

$$W_2 \in \left\{ \frac{1}{\sqrt{2}} \begin{bmatrix} Y_1 & Y_1 \\ Y_2 & -Y_2 \end{bmatrix}, \frac{1}{\sqrt{2}} \begin{bmatrix} Y_1 & Y_1 \\ jY_2 & -jY_2 \end{bmatrix} \right\}.$$

For a cross polarized linear antenna array closely arranged, column selection vectors $Y_1$ and $Y_2$ in each column (data stream) that are used in two polarization directions may determine identical vectors in the first codeword, and $Y_1$ and $Y_2$ may be selected as:

$$\begin{bmatrix} Y_1 \\ Y_2 \end{bmatrix} \in \left\{ \begin{bmatrix} \tilde{e}_1 & \tilde{e}_3 \\ \tilde{e}_1 & \tilde{e}_3 \end{bmatrix}, \begin{bmatrix} \tilde{e}_2 & \tilde{e}_4 \\ \tilde{e}_2 & \tilde{e}_4 \end{bmatrix} \right\}.$$

$\tilde{e}_l$ is an $N_b \times 1$ column selection vector, and except that an $l^{th}$ ($1 \le l \le N_b$) element is 1, all other values are 0.

For a cross polarized linear antenna array sparsely arranged, column selection vectors $Y_1$ and $Y_2$ in each column (data stream) that are used in two polarization directions may determine orthogonal vectors in the first codeword, and $Y_1$ and $Y_2$ may be selected as:

$$\begin{bmatrix} Y_1 \\ Y_2 \end{bmatrix} \in \left\{ \begin{bmatrix} \tilde{e}_1 & \tilde{e}_3 \\ \tilde{e} & \tilde{e}_{31} \end{bmatrix}, \begin{bmatrix} \tilde{e}_2 & \tilde{e}_4 \\ \tilde{e}_2 & \tilde{e}_4 \end{bmatrix} \right\}.$$

The quantization overhead of the second codeword whose rank is 4 includes a 1-bit co-phasing information quantization overhead and a 2-bit column selection quantization overhead.

In summary, the method for quantizing CSI according to the present invention may use four bits to quantize the first codeword of each rank, and the second codeword may also be controlled within a four-bit quantization overhead, which improves accuracy of quantization with a lower quantization overhead, and saves valuable uplink resources.

Although the above description of the present invention takes four-antenna cross polarized antenna arrangement as an example, persons skilled in the art should understand that the method for quantizing CSI according to the present invention may be completely applied to other antenna arrangements based on the above inspirations and teachings.

Figure 3:
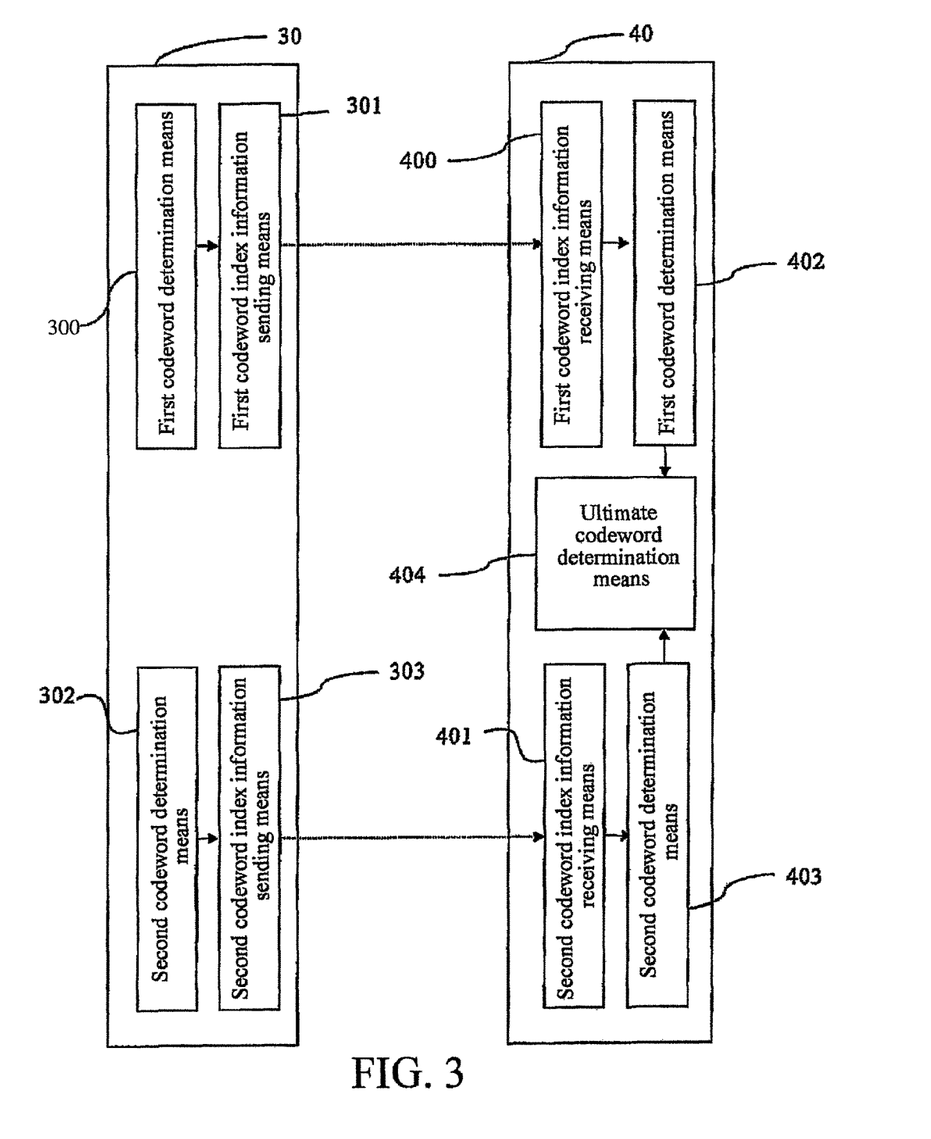
FIG. 3 is a schematic structural block diagram of a wireless communication system for quantizing CSI with a two-stage codebook according to an embodiment of the present invention.

In addition, FIG. 3 is a block diagram of a wireless communication system including a UE and a base station for quantizing CSI according to an embodiment of the present invention. As shown in FIG. 3, in the wireless communication system, a UE 30 provides codeword indexes to a base station 40, and the base station 40 determines codewords based on the codeword indexes provided by the UE 30. The UE 30 includes: a first codeword determination means 300, for determining, according to an estimated broadband channel matrix and based on a first predetermined criterion, a first codeword in a first codebook whose rank is r, where r=1, 2, . . . ; a first codeword index sending means 301, for sending a codeword index of the first codeword to the base station 40; a second codeword determination means 302, for determining, for each sub-band according to an estimated sub-band channel matrix and based on a second predetermined criterion, a second codeword in a second codebook whose rank is r; and a second codeword index sending means 303, for sending a codeword index of the second codeword to the base station 40.

Correspondingly, the base station 40 includes: a first codeword index receiving means 400, for receiving the index of the first codeword in the first codebook whose rank is r provided by the UE 30; a second codeword index receiving means 401, for receiving the index of the second codeword in the second codebook whose rank is r provided by the UE 30; a first codeword determination means 402, for determining, according to the index of the first codeword, the first codeword from the first codebook whose rank is r; a second codeword determination means 403, for determining, according to the index of the second codeword, the second codeword from the second codebook whose rank is r; and an ultimate codeword determination means 404, for ultimately determining the codeword based on the first codeword and the second codeword.

It should be noted that with the development of the technology and update of the standard, components with the same function generally have different names. The technical terms in the specification of the present invention patent application are used to explain and demonstrate the technical solution of the present invention, and shall be subject to common functions in the technical field rather than being randomly understood merely according to the names thereof.

The technical content and technical features of the present invention are disclosed above, and persons skilled in the art may still make various replacements and modifications without departing from the spirit of the present invention on the basis of the teaching and disclosure of the present invention. Hence, the protection scope of the present invention shall not be limited to the content disclosed by the embodiments, but shall cover all replacements and modifications not departing from the present invention and shall subject to the claims of the present patent application.

We claim:

1. A method for providing codeword index information to a base station from a user equipment (UE), the base station being configured with $N_t$ directional antennas, the method comprising:

determining, by the UE, according to an estimated broadband channel matrix and based on a first predetermined criterion, a first codeword in a first codebook whose rank is r, wherein the first codeword indicates broadband/long-term channel characteristics of antenna pairs having the same polarization direction, and r=1, 2, . . . , $N_t$;

sending a codeword index of the first codeword from the UE to the base station;

determining, by the UE, for each sub-band according to an estimated sub-band channel matrix and based on a second predetermined criterion, a second codeword in a second codebook whose rank is r, wherein the second codeword indicates sub-band/short-term channel characteristics of each polarization direction and between the polarization directions; and sending a codeword index of the second codeword from the UE to the base station;

wherein the first codeword is a block diagonal matrix, a matrix on a diagonal block of the block diagonal matrix is a matrix with $$\frac{N_t}{2}$$

rows and $N_b$ columns, the $N_b$ columns are $N_b$ different Discrete Fourier Transform (DFT) vectors arbitrarily selected from N predefined DFT vectors, N is an integer power of 2, $1 \leq N_b \leq N$, and the length of each DFT vector is $N_t$;

wherein the second codeword is constructed based on column selection of the first codeword and co-phasing information between the polarization directions, and each column corresponding to each data stream in the second codeword comprises an equal-length column selection vector for individually selecting from the $N_b$ columns in the first codeword the DFT vectors used in two polarization directions and co-phasing information $$\theta = \frac{2\pi m}{M}$$

between the two polarization directions, where M is an integer power of 2, and $0 \leq m \leq M-1$.

2. The method according to claim 1, wherein the column selection vector $\tilde{e}_l$ is an $N_b \times 1$ selection vector, and except that an $l^{th}$ ($1 \leq l \leq N_b$) element is 1, all other values are 0.

3. The method according to claim 1, further comprising:

using $N_u$ bits to quantize the first codeword of the block diagonal matrix, where $N_u$ is equal to or less than $\log_2 N$;

using $N_o$ bits to quantize the co-phasing information, where $N_o$ is equal to or less than $\log_2 M$, and the same or different values are taken for $N_o$ corresponding to different ranks; and using $N_e$ bits to quantize the column selection vector, where each column selection vector $N_e$ is equal to or less than $\log_2 N_b$.

4. The method according to claim 1, wherein the $N_b$ columns are four columns, the DFT vectors in the first column and the second column and the DFT vectors in the third column and the fourth column are adjacent vectors, and the DFT vectors in the first column and the third column and the DFT vectors in the second column and the fourth column are orthogonal vectors.

5. The method according to claim 4, wherein when the rank is 1, the second codeword has one column of data streams;

when the $N_t$ directional antennas are arranged closely, column selection vectors corresponding to a first polarization direction and column selection vectors corresponding to a second polarization direction in the column of data streams determine identical DFT vectors in the first codeword; and when the $N_t$ linearly polarized antennas are arranged sparsely, column selection vectors corresponding to the first polarization direction and column selection vectors corresponding to the second polarization direction in the column of data streams determine orthogonal DFT vectors in the first codeword.

6. The method according to claim 4, wherein when the rank is 2, the second codeword has two columns of data streams;

when the $N_t$ linearly polarized antennas are arranged closely, column selection vectors respectively corresponding to two polarization directions in each column of the two columns of data streams determine identical DFT vectors in the first codeword, and two column selection vectors in each polarization direction determine identical or orthogonal DFT vectors in the first codeword; and when the $N_t$ linearly polarized antennas are arranged sparsely, column selection vectors respectively corresponding to two polarization directions in each column of the two columns of data streams determine orthogonal DFT vectors in the first codeword, and two column selection vectors in each polarization direction determine identical or orthogonal DFT vectors in the first codeword.

7. A method for determining a codeword by a base station, the codeword having a two-stage feedback structure, and the base station being configured with $N_t$ directional antennas, the method comprising:
receiving an index of a first codeword in a first codebook whose rank is r from a user equipment (UE) at the base station, wherein the first codeword indicates broadband/long-term channel characteristics of antenna pairs having the same polarization direction, and r=1, 2, . . . , $N_t$;
receiving an index of a second codeword in a second codebook whose rank is r from the UE at the base station, wherein the second codeword indicates subband/short-term channel characteristics of each polarization direction and between the polarization directions;
determining, at the base station, according to the index of the first codeword, the first codeword from the first codebook whose rank is r;
determining, at the base station, according to the index of the second codeword, the second codeword from the second codebook whose rank is r; and
ultimately determining the codeword, at the base station, based on the first codeword and the second codeword;
wherein the first codeword is a block diagonal matrix, a matrix on a diagonal block of the block diagonal matrix is a matrix with $$\frac{N_t}{2}$$

rows and $N_b$ columns, the $N_b$ columns are $N_b$ different Discrete Fourier Transform (DFT) vectors arbitrarily selected from N predefined DFT vectors, N is an integer power of 2, $1 \le N_b \le N$, and the length of each DFT vector is $N_t$;
wherein the second codeword is constructed based on column selection of the first codeword and co-phasing information between the polarization directions, and each column corresponding to each data stream in the second codeword comprises an equal-length column selection vector for individually selecting from the $N_b$ columns in the first codeword the DFT vectors used in two polarization directions and co-phasing information $$\theta = \frac{2\pi m}{M}$$

between the two polarization directions, where M is an integer power of 2, and $0 \le m \le M-1$.

8. The method according to claim 7, wherein the column selection vector $\tilde{e}_l$ is an $N_b \times 1$ selection vector, and except that an $l^{th}$ ($1 \le l \le N_b$) element is 1, all other values are 0.

9. The method according to claim 7, wherein the first codeword of the block diagonal matrix is quantized by using $N_u$ bits, where $N_u$ is equal to or less than $\log_2 N$;
$N_o$ bits are used to quantize the co-phasing information, where $N_o$ is equal to or less than $\log_2 M$, and the same or different values are taken for $N_o$ corresponding to different ranks; and
$N_e$ bits are used to quantize the column selection vector, where each column selection vector $N_e$ is equal to or less than $\log_2 N_b$.

10. The method according to claim 7, wherein the $N_b$ columns are four columns, the DFT vectors in the first column and the second column and the DFT vectors in the third column and the fourth column are adjacent vectors, and the DFT vectors in the first column and the third column and the DFT vectors in the second column and the fourth column are orthogonal vectors.

11. The method according to claim 10, wherein when the rank is 1, the second codeword has one column of data streams;
when the $N_t$ directional antennas are arranged closely, column selection vectors corresponding to a first polarization direction and column selection vectors corresponding to a second polarization direction in the column of data streams determine identical DFT vectors in the first codeword; and
when the $N_t$ linearly polarized antennas are arranged sparsely, column selection vectors corresponding to the first polarization direction and column selection vectors corresponding to the second polarization direction in the column of data streams determine orthogonal DFT vectors in the first codeword.

12. The method according to claim 10, wherein when the rank is 2, the second codeword has two columns of data streams;
when the $N_t$ linearly polarized antennas are arranged closely, column selection vectors respectively corresponding to two polarization directions in each column of the two columns of data streams determine identical DFT vectors in the first codeword, and two column selection vectors in each polarization direction determine identical or orthogonal DFT vectors in the first codeword; and
when the $N_t$ linearly polarized antennas are arranged sparsely, column selection vectors respectively corresponding to two polarization directions in each column of the two columns of data streams determine orthogonal DFT vectors in the first codeword, and two column selection vectors in each polarization direction determine identical or orthogonal DFT vectors in the first codeword.

13. A user equipment (UE) for providing codeword indexes to a base station, the base station being configured with $N_t$ directional antennas, the UE comprising: at least one processor and associated memory; and a transmitter; wherein the at least one processor is configured to determine, according to an estimated broadband channel matrix and based on a first predetermined criterion, a first codeword in a first codebook whose rank is r, wherein the first codeword indicates broadband/long-term channel characteristics of antenna pairs having the same polarization direction, and r=1, 2, . . . , $N_t$;
wherein the at least one processor and transmitter are configured to send a codeword index of the first codeword to the base station;
wherein the at least one processor is configured to determine, for each sub-band according to an estimated sub-band channel matrix and based on a second predetermined criterion, a second codeword in a second codebook whose rank is r, wherein the second codeword indicates sub-band/short-term channel characteristics of each polarization direction and between the polarization directions;

wherein the at least one processor and transmitter are configured to send a codeword index of the second codeword to the base station;

wherein the first codeword is a block diagonal matrix, a matrix on a diagonal block of the block diagonal matrix is a matrix with $$\frac{N_t}{2}$$

rows and $N_b$ columns, the $N_b$ columns are $N_b$ different Discrete Fourier Transform (DFT) vectors arbitrarily selected from N predefined DFT vectors, N is an integer power of 2, $1 \leq N_b \leq N$, and the length of each DFT vector is $N_t$;

wherein the second codeword is constructed based on column selection of the first codeword and co-phasing information between the polarization directions, and each column corresponding to each data stream in the second codeword comprises an equal-length column selection vector for individually selecting from the $N_b$ columns in the first codeword the DFT vectors used in two polarization directions and co-phasing information $$\theta = \frac{2\pi m}{M}$$

between the two polarization directions, where M is an integer power of 2, and $0 \leq m \leq M-1$.

14. A base station, configured with $N_t$ directional antennas, comprising: at least one processor and associated memory; and a receiver;

wherein the receiver is configured to receive an index of a first codeword in a first codebook whose rank is r, wherein the first codeword indicates broadband/long-term channel characteristics of antenna pairs having the same polarization direction, and r=1, 2, . . . , $N_t$;

wherein the receiver is configured to receive an index of a second codeword in a second codebook whose rank is r, wherein the second codeword indicates sub-band/short-term channel characteristics of each polarization direction and between the polarization directions;

wherein the at least one processor is configured to determine, according to the index of the first codeword, the first codeword from the first codebook whose rank is r;

wherein the at least one processor is configured to determine, according to the index of the second codeword, the second codeword from the second codebook whose rank is r;

wherein the at least one processor is configured to ultimately determine the codeword based on the first codeword and the second codeword;

wherein the first codeword is a block diagonal matrix, a matrix on a diagonal block of the block diagonal matrix is a matrix with $$\frac{N_t}{2}$$

rows and $N_b$ columns, the $N_b$ columns are $N_b$ different Discrete Fourier Transform (DFT) vectors arbitrarily selected from N predefined DFT vectors, N is an integer power of 2, $1 \leq N_b \leq N$, and the length of each DFT vector is $N_t$;

wherein the second codeword is constructed based on column selection of the first codeword and co-phasing information between the polarization directions, and each column corresponding to each data stream in the second codeword comprises an equal-length column selection vector for individually selecting from the $N_b$ columns in the first codeword the DFT vectors used in two polarization directions and co-phasing information $$\theta = \frac{2\pi m}{M}$$

between the two polarization directions, where M is an integer power of 2, and $0 \leq m \leq M-1$.

* * * * *